US010560372B1

(12) United States Patent
Lucas et al.

(10) Patent No.: US 10,560,372 B1
(45) Date of Patent: Feb. 11, 2020

(54) REQUEST ROUTING BASED ON SERVER SOFTWARE VERSIONS

(71) Applicant: Amazon Technologies, Inc., Seattle, WA (US)

(72) Inventors: Tai Geoffrey Lucas, Cape Town (ZA); Marcin Piotr Kowalski, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 186 days.

(21) Appl. No.: 15/688,674

(22) Filed: Aug. 28, 2017

(51) Int. Cl.
*H04L 12/725* (2013.01)
*H04L 29/08* (2006.01)
*H04L 12/721* (2013.01)

(52) U.S. Cl.
CPC ............ *H04L 45/306* (2013.01); *H04L 45/70* (2013.01); *H04L 45/72* (2013.01); *H04L 67/327* (2013.01); *H04L 45/34* (2013.01)

(58) Field of Classification Search
None
See application file for complete search history.

(56) References Cited

U.S. PATENT DOCUMENTS

| | | | |
|---|---|---|---|
| 8,200,818 B2 | 6/2012 | Freund et al. | |
| 9,268,663 B1 * | 2/2016 | Siddiqui | G06F 11/3447 |
| 10,097,431 B1 * | 10/2018 | Moniz | H04L 41/5051 |
| 10,250,455 B1 * | 4/2019 | Moniz | H04L 41/50 |
| 2005/0282523 A1 * | 12/2005 | Yoshihara | H04L 12/2854 |
| | | | 455/411 |
| 2006/0009996 A1 * | 1/2006 | Lipscomb | G06Q 30/0601 |
| | | | 709/220 |
| 2006/0075398 A1 | 4/2006 | Bennett et al. | |
| 2008/0016203 A1 * | 1/2008 | Song | H04L 29/08846 |
| | | | 709/223 |
| 2009/0187970 A1 * | 7/2009 | Mower | H04L 67/025 |
| | | | 726/3 |
| 2010/0302995 A1 * | 12/2010 | Morioka | H04L 12/4625 |
| | | | 370/315 |

(Continued)

OTHER PUBLICATIONS

Taber, Nathan. Blue/Green Deployments with Amazon Elastic Container Service. Posted at https://aws.amazon.com/blogs/compute/bluegreen-deployments-with-amazon-ecs/ on Jun. 30, 2017 (Year: 2017).*

*Primary Examiner* — Scott B Christensen
(74) *Attorney, Agent, or Firm* — Robert C. Kowert; Kowert, Hood, Munyon, Rankin & Goetzel, P.C.

(57) ABSTRACT

Systems and methods are disclosed to implement a request routing layer of a service provider system, where the request routers are aware of different versions of a service implemented by the servers of the system. In embodiments, the request routers may discover the different versions of the service via periodic health messages or request responses from the servers. Requests are routed to the servers according to a routing policy that specifies the relative proportions of requests that are to be routed to each version. Version metrics generated from the requests may be captured and provided to a version change manager, which may update the routing policy based on the metrics, either increasing or decreasing the proportion of requests for the different versions. In embodiments, the request router may implement additional rules that control their routing behavior in response to detected error conditions.

20 Claims, 12 Drawing Sheets

(56) References Cited

U.S. PATENT DOCUMENTS

2014/0317289 A1* 10/2014 Shahpurwala ...... H04L 67/2814
709/225
2016/0042183 A1* 2/2016 Ciordas .................. G06F 11/10
726/26

* cited by examiner

| instance 310 | node 312 | port 314 | version 316 | state 318 | count 320 | error X 322 | error Y 324 | error Z 326 | latency 328 |
|---|---|---|---|---|---|---|---|---|---|
| 00 | 93 | 33 | 1 | running | 403 | 7 | 1 | 0 | 10 |
| 01 | 92 | 33 | 1 | running | 308 | 2 | 0 | 0 | 9 |
| 02 | 90 | 33 | 1 | running | 508 | 0 | 0 | 0 | 9 |
| 03 | 55 | 33 | 1 | running | 608 | 0 | 0 | 0 | 9 |
| 04 | 57 | 33 | 1 | running | 430 | 5 | 1 | 0 | 10 |
| 05 | 58 | 33 | 1 | running | 526 | 3 | 0 | 0 | 10 |
| 06 | 59 | 33 | 1 | running | 372 | 2 | 0 | 0 | 9 |
| 07 | 91 | 33 | 1 | running | 539 | 2 | 0 | 0 | 9 |
| 08 | 90 | 36 | 2 | blacklisted | 423 | 2 | 1 | 0 | 9 |
| 09 | 91 | 36 | 2 | unresponsive | 498 | 7 | 7 | 1 | 21 |
| 0A | 233 | 36 | 2 | running | 353 | 0 | 0 | 0 | 9 |
| 0B | 236 | 36 | 2 | running | 503 | 0 | 0 | 0 | 8 |

| | | | | request type A 520 | | | | | | request type B 530 | request type C 540 |
|---|---|---|---|---|---|---|---|---|---|---|---|
| version 510 | current request distrib 512 | no. instances 514 | running instances 516 | count 522 | error X 524 | error Y 525 | error Z 526 | latency 528 | perform. score 529 | | |
| 1 | 70% | 240 | 240 | 43203 | 65 | 39 | 1 | 12 | 91 | | |
| 2 | 10% | 12 | 12 | 6269 | 4 | 3 | 1 | 10 | 92 | | |
| 2.1 | 5% | 6 | 6 | 1402 | 15 | 12 | 4 | 10 | 75 | | |
| 2.2 | 5% | 6 | 4 | 1294 | 15 | 9 | 7 | 10 | 70 | | |
| 3 | 5% | 12 | 9 | 1692 | 58 | 42 | 5 | 12 | 65 | | |

US 10,560,372 B1

REQUEST ROUTING BASED ON SERVER SOFTWARE VERSIONS

BACKGROUND

Modern service provider systems are often implemented in a distributed and layered fashion, employing a frontend layer of request routing nodes tasked with forwarding received requests to a backend layer of server nodes. In many cases, the workload level of a system may vary substantially over time, with new server nodes being added or removed as needed based on various scaling policies of the system and/or the network-accessible services being employed by the system. Often, the workload may comprise units of work which can be performed largely independently of one another by individual server nodes. In some systems, hundreds or thousands of server nodes may be configured for a given application. In many such systems, the request routing nodes may act as load balancers to distribute work units equitably among the back-end worker nodes.

In some systems, newer versions of services may be developed to replace existing versions. However, such newer versions are often inherently less safe than older versions, as they have not been exposed to the same amount of real-world request traffic as the older versions. Thus, the deployment of new service versions in such systems often represents a balance between risk and innovation. Some systems may employ costly risk mitigation techniques such as timed deployments, which may entail long "bake times" for new deployments and slow deployment cycles. In some cases, these staged deployment strategies ironically contribute to the risk by increasing the complexity of the deployment process.

BRIEF DESCRIPTION OF THE DRAWINGS

FIG. 3 illustrates metrics that are used by a version-aware request router to make routing decisions, according to some embodiments.

Figure 1:
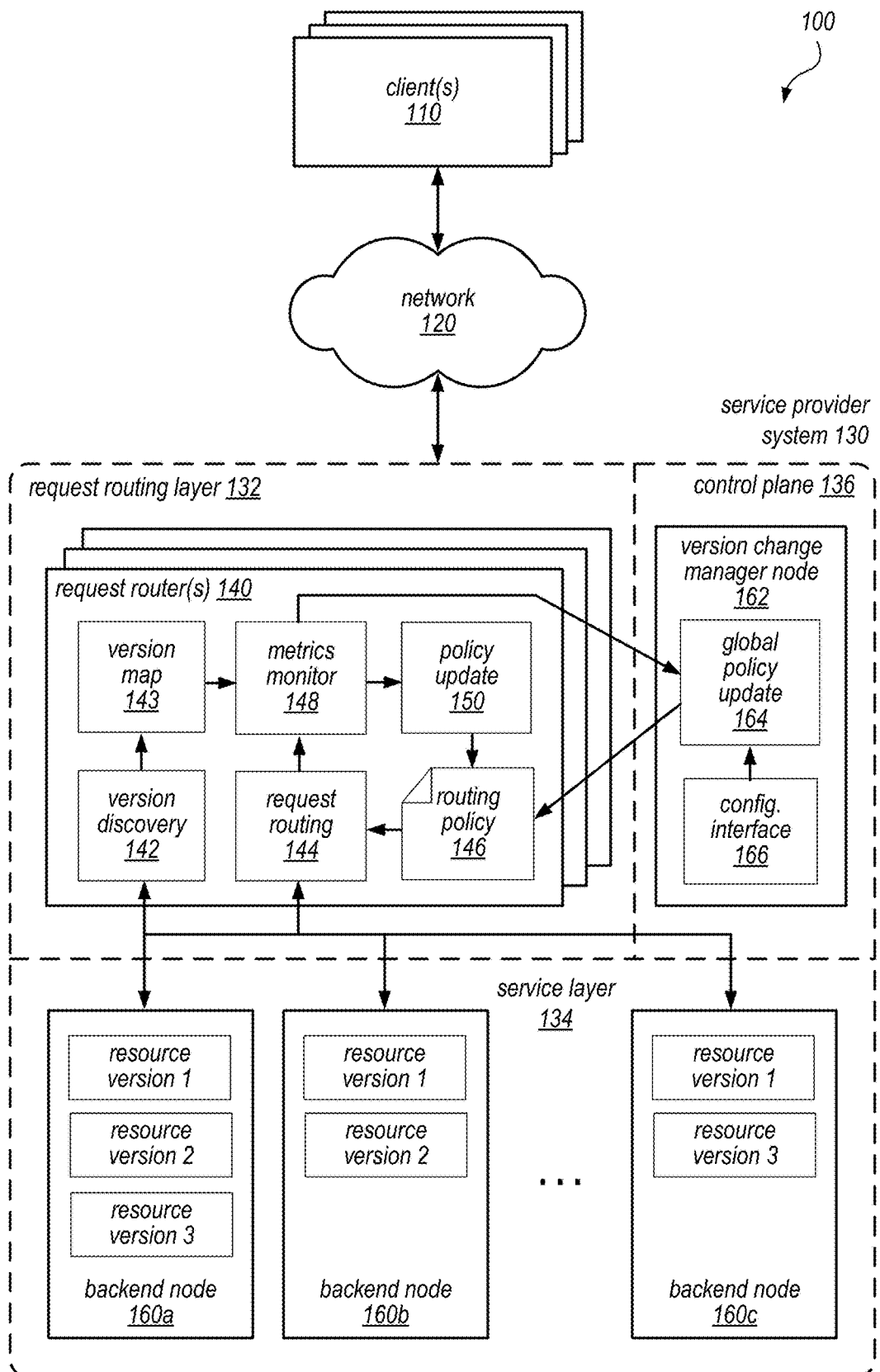
FIG. 1 is a block diagram illustrating an example computer system that employs version-aware request routers, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be used in various combinations and in various embodiments to implement a service provider system that uses request routers that are aware of different versions of services that are hosted in the service provider system.

Modern service provider systems are often implemented in a distributed and layered fashion, employing a frontend layer of request routing nodes tasked with forwarding received requests to a backend layer of server nodes. For example, many modern service provider systems are implemented a complex and ever-growing cloud environment. In these system, new versions of services or other resources may be developed to replace existing versions of services or resources. However, these version changes generally entail a number of risks. For one thing, new versions of services or resources are not as safe as the older versions, because they have not been fully exposed to the real-world request traffic in a production environment. In some cases, new versions of services or resources may behave differently from the older versions, in ways that are unforeseen in the development setting. Thus, the deployment of new versions of services or resources often represents a balance between risk and innovation. Standard ways of mitigating risk like timed deployments may result in long and slow deployment cycles. Moreover, batched deployment strategies ironically contribute to the deployment risk by forcing the introduction of changes in large batches, which increases risk of batch failure.

Accordingly, in some embodiments disclosed herein, a layer of request routers in a service provider system is provided with a deeper understanding of specific semantics of the multi-tenant, multi-API, and multi-version service layer. In some embodiments, an application layer version number may be provided to the request routers, via for example server messages such as health check messages. This information allows the request router to discover version changes in the application layer. In some embodiments, the request routers may be configured via a routing policy, to treat a new version of a service or resource skeptically. For example, in some embodiments, the request router may, based on defined or learned heuristics, drive request traffic in a gradual fashion onto the new version, and quickly move request traffic away from the new version upon the detection of error conditions.

In some embodiments, a new version may be upgraded within the service provider system to receive a larger proportion of the request traffic or downgraded to receive a smaller proportion of the request traffic, based on a measure of behavior difference between the new version and one or more older versions. For example, the behavior differences may be determined based on a rolling normalized window of HTTP response codes for version 1 of a resource and version 2 of the resource. If there is a wide difference between the respective histograms of the response codes from the two versions (e.g., version 2 produces more error codes from the same general type of traffic), the request router may autonomously move more request traffic back to the "safe" version 1.

In some embodiments, a "diversity" measure may be tracked, which indicates frequency distributions of different types of API calls, request sources, or canonicalized request types, for different versions of a resource hosted in the system. This sort of measure or metric allows the request router or system to reason about when it is safe to roll a version out further (e.g., upgrade the version to receive a higher proportion of requests), based on the heuristic of "coverage." Thus, a newer version may be allowed to receive a small proportion of requests until sufficient coverage is reached on various types of functionality, before it is upgraded. This sort of metric represents a more meaningful measurement of the use of a version of software than "bake times," which is just a proxy for diversity.

In some embodiments, the request router may implement both data plane primitive logic (e.g., simple expert system rules) to implement low latency autonomous recovery in the presence of grievous failures, and also a control plane logic to make more sophisticated decisions at the aggregate data level. For example, such sophisticated decision-making may involve upgrading or downgrading a version in the system based on aggregated diversity metrics, call rate, and/or performance data. In some embodiments, the data plane logic may be implemented on the request routers, while the control plane logic may be implemented on a separate version change manager host. In some embodiments, the version change manager host may simply be one of the request routers, and the decisions of the one version change manager may be distributed to the other request routers via a peer-to-peer protocol.

In some embodiments, a system implementing these request routers may allow for an automatic rollout of control plane policies about different resource versions, based on the metrics that the routers are gathering about versions operating in the system. The request routers thus may perform a dual role of both a router/load balancer as well as a software rollout system. As may be understood, such a software rollout system is capable of performing the rollout with much lower latency. In addition, the software rollout system is capable of modifying the deployment levels of different resource versions gradually, based on different configurable criteria, and on a per-request basis. These and additional features and benefits of the inventive concepts are discussed in more detail below, in connection with the figures.

It should be noted that as understood herein, the "version" may encompass not just the version of a software component, but also a number of other elements of an execution environment. For example, in some embodiments, the version may include a particular version of the underlying operating system or hardware. In some embodiments, the version may indicate different variations of software loaded on an executing backend node, such as for example the combination of security patches or software updates that have been applied to the backend node. In some embodiments where a combination of software and hardware elements are used to implement a resource to service requests, the version may be a composite value that incorporates some or all of the versions and configurations of components in the combined resource. For example, for a particular web service, the version of that resource may be composed of the versions of the web service, the web server, the application server, the database server, the operating system (along with any software updates) on each machine, any application or software libraries used, any hypervisor platforms involved, the underlying server hardware, etc.

In some embodiments, the "version" may include the versions of particular components that were invoked in servicing a request, and would thus change from request to request. Thus, for example, in some embodiments the version may indicate the versions of software components that are used in different layers of an application that were used in servicing the request or the versions of a group of server or storage nodes that were used in servicing the request. Thus, each particular combination of layer components and/or nodes may be treated as a different overall "version" by the request routers for monitoring and version management purposes.

FIG. 1 is a block diagram illustrating an example computer system that employs version-aware request routers, according to some embodiments. As shown, system 100 may include a service provider system 130, that is configured to interact with multiple clients 110 over a network 120.

The clients 110 may encompass any type of client configurable to submit requests to the service provider system 130. For example, a given client 110 may include a suitable version of a web browser, or may include a plug-in module or other type of code module configured to execute as an extension to or within an execution environment provided by a web browser. Alternatively, a client 110 may encompass an application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 110 may be configured to generate network-based services requests according to a Representational State Transfer (REST)-style network-based services architecture, a document- or message-based network-based services architecture, or another suitable network-based services architecture.

The clients 110 may convey network-based services requests to the service provider system 130 via network 120. In various embodiments, network 120 may encompass any suitable combination of networking hardware and protocols necessary to establish network-based communications between clients 110 and service provider system 130. For example, a network 120 may generally encompass the various telecommunications networks and service providers that collectively implement the Internet. A network 120 may also include private networks such as local area networks (LANs) or wide area networks (WANs) as well as public or private wireless networks. For example, both a client 110 and the service provider system 130 may be respectively provisioned within enterprises having their own internal networks. In such embodiments, the network 120 may include the hardware (e.g., modems, routers, switches, etc.) and software (e.g., protocol stacks, accounting software, firewall/security software, etc.) necessary to establish a networking link between the client 110 and the Internet as well as between the Internet and service provider system 130. In some embodiments, clients 110 may communicate with service provider system 130 using a private network rather than the public Internet.

The computing services offered by the service provider system 130 may include a variety of types of services that allows clients 110 to use computing resources in the service provider network 130 for a variety of purposes. These computing services can, for example, provide access to generic compute instances. Computing services can also provide access to specialized compute instances with specialized functionality, such as routers, domain name systems (DNSs), load balancers, desktop virtualization servers, and the like. The computing services may include various types of storage services that expose different types of storage access interfaces, including block-based storage services, relational database services, NoSQL database services, file system services, and the like. Computing services may also include services that provide functionalities of commonly used software modules, which can be used in conjunction with other software to implement larger systems. For example, computing services may include queuing services, notification services, logging services, key storage and management services, and the like. The computing services may include services that implement larger systems with sophisticated functionality, such as machine learning, identity management, software development environments, multi-tenant containers for hosting software tenants, and the like. The computing services may be standard services provided by the service provider, or services implemented by third parties on top of the standard services. The computing services generally operate on computing resources of the service provider system 130, and may be controlled and configured by clients 110 via various interfaces such as graphical user interface (GUI) (e.g., as part of an administration control panel or web site) and/or as a programmatic interface such as an Application Programming Interface (API).

As shown, in some embodiments, the service provider system 130 may be divided into two or more layers, including a request routing layer 132 and an underlying service layer 134. The request routing layer 132 may include a fleet of request routers 140. Depending on the embodiment, each request router may be a physical host, a virtual machine instance, or a process running on a physical host or virtual machine. The request routers 140 may be tasked with receiving various requests from the clients 110 and forward those requests to backend nodes (e.g., backend nodes 160a, 160b, and 160c) in the service layer 134. In some embodiments, the request routers 140 may also receive responses from the backend nodes 160 and return the responses back to the clients 110.

In some embodiments, the request routers 140 may perform a load balancing function to distribute requests among the backend nodes 160 in an equitable fashion. In some embodiments, the request routers may perform a request filtering function or perform some initial pre-processing on the incoming requests. In some embodiments, the requests routers 140 may implement one or more request queues to queue incoming requests before they are forwarded to one or more selected backend nodes 160. In some embodiments, the request routers may implement a throttling function to throttle requests when the queues become full, so as to protect the system from attacks such as denial-of-service attacks. In some embodiments, the request routers 140 may comprise gateway nodes for the service provider system 130, and implement security measures such as firewalls and other more sophisticated attack detection and prevention functions. In some embodiments, the request routers 140 may represent a metrics collection point for incoming requests, and log both the incoming requests and their associated metrics, for example, the requests' source and arrival time. In some embodiments, at least some portion of these metrics are collected by the metrics monitoring module 148, as shown.

In some embodiments, the request routers 140 may include a version discovery module 142. The version discovery module may be configured to automatically discover the different versions of different resources that are hosted on the backend nodes 160 in the service layer 134. For example, in some embodiments, a backend node 160a may host multiple versions of a resource, for example versions 1 to 3, as shown. In some embodiments, the API of the different versions of the resource are the same to the client, so that the clients 110 may remain oblivious to which version of the resource is used to handle their requests. In some embodiments, there may be differences in the APIs of the different versions. In that case, in some embodiments, the request router 140 may be configured to translate a request formatted for the API of a first version to the API of a second version. Such low-level translations may be loaded on each of the request routers as a part of resource deployment to facilitate routing of incoming request to the different versions.

In some embodiments, the version discovery module 142 may detect versions that are hosted on each backend node 160 based on server messages. For example, in some embodiments, the request router 140 may send a ping or query message to each backend node 160 to receive the different types of resources that are running on the backend node. In response to such a ping or query, the backend node may return its running resources and the port number that each resource is listening on. In some embodiments, such a ping or query may be performed when a new backend node is provisioned or launched in the service layer. In some embodiments, such pinging may be repeated periodically in the system. In some embodiments, the backend nodes 160 may themselves generate heartbeat messages back to the request routers 140, indicating their status, condition, among other data. Thus, the running resources (and services versions) on a backend node 160 may be included in the heartbeat message. In these and other fashion known to those skilled in the art, running resource versions on each host in the service layer 134 may be made known to the request routers 140 via the version discovery module 142. In some embodiments, the version discovery module 142 may maintain its knowledge of the nodes and versions in the service layer 134 in a version map 143. In some embodiments, the version map 143 may be an in-memory data structure that reflects the nodes in the service layer 134, which versions are stored on each node, and the network addresses (e.g., port number) that may be used to forward requests to each version. In some embodiments, only a subset of request routers 140 may keep track of the backend nodes 160 (and the running versions on the backend nodes), and share such information with other request routers 140 in the request routing layer via a peer-to-peer protocol. In some embodiments, once the request router 140 discovers the versions on each backend node, this information may be maintained in a data store on the request router 140, and used to route incoming requests.

In some embodiments, as shown, the request router 140 may implement a request routing module 144, which implements the function of actually forwarding incoming requests to the backend nodes 160. As may be understood, the routing algorithm may select a backend node 160 for each incoming request, and forward the request to the selected backend node to be handled. In some embodiments, the request router 140 may also receive the response from the backend node and relay the response back to the requesting client. In some embodiments, the routing may select a backend node 160 and a port number (e.g., a TCP port number) on the backend node, which may identify a running instance of a service.

In some embodiments, the routing behavior of the routing module 144 may be controlled in part by a routing policy 146. The routing policy may include a number of simple routing rules that dictate how requests are routed. In some embodiments, the routing policy 146 may include rules that specify particular versions of resources hosted in the system. For example, in some embodiments, the routing policy 146 may indicate that a certain proportion of a type of request are to be handled by a first version of a resource, and that a remaining portion of that type of request are to be handled by a second version of the resource. In some embodiments, a single routing policy may specify multiple request types and multiple versions, each being assigned a different proportion of request traffic for requests of that type. In some embodiments, the routing policy 146 may be distributed to the request routers 144 by one or more central policy masters. In some embodiments, the routing policies 146 may be propagated via a peer-to-peer protocol.

In some embodiments, as shown, the request router 140 may implement a metrics monitoring module 148. The metrics monitoring module may collect various metrics associated with the incoming requests and/or the routing of these requests. For example, the metrics monitor 148 metrics such as the source and type of each request, and the server ID and service version number (or port number) that each request was forwarded to. In some embodiments, the responses from each request, including any error codes, are also captured. In some embodiments, the metrics monitor 148 may compute certain additional metrics on top of the raw data of the incoming request, such as a count of how many requests have been forwarded to each version of a service. Such a count may be used by the request router 140 to enforce rules in the routing policy 146 that limit the proportion of incoming request for different versions. In some embodiments, a latency may be determined for each request, which indicates the amount of time between when a request was sent to a backend node 160 and when a response was received from the backend node. In some embodiments, the metrics monitor 148 may aggregate the data of many requests to determine aggregate data over different versions, for example, the number of error that have been generated for each version, the average latency of each version, etc. In some embodiments, the metrics monitor 148 may compute more complex metrics from the raw data, for example, a diversity metric in terms of the type of requests that are seen by that particular router 140. Some of the captured metrics may be maintained in the request router's operating memory, which may be used to control the request-by-request routing behavior of the router.

Some of the captured metrics may not be used to determine the immediately routing behavior of the router, and may thus be saved to a log. In some embodiments, the log may be periodically provided to a version change manager 150, which may be responsible for aggregating captured metrics for all request routers. In some embodiments, the type of metrics that are captured by the metrics monitor 148 may be dictated by a set of rules, which may be configurable by an administrator and distributed to the request routers 140 ahead of time.

As shown, in some embodiments, the system 130 may implement a policy update module 150. The policy update module 150 may continually or periodically analyze the metrics data to make decisions about the upgrading and/or downgrading of versions within the system 130. In some embodiments, the upgrading may involve increase the proportion of requests that are handled by a particular version. This increase may come at the expense of another version in the system. For example, in some embodiments, as a new version (e.g. version 2) is upgraded, a designated parent version (e.g. version 1) is downgraded in conjunction. In some embodiments, the upgrade may also involve a further deployment of more service instance of that particular version to more server nodes in the service layer 134. In some embodiments, a version in the system may be associated with an upgrade schedule that indicates different deployment levels, where high deployment levels indicate high numbers of requests and/or service nodes for that version. The policy update module 150 may upgrade or downgrade the version by moving the version from one deployment level to another, based on the observed metrics of that version. In some embodiments, as deployment level of a version changes, a new or updated routing policy may be generated to update the existing routing policy 146 used by the request routers 140.

As shown, in some embodiments, the system 130 may implement a version change manager node 162 in a control plane 136. The version change manager node 162 may be a separate compute node in the system 130. In some embodiments, the version change manager node 162 may be in a different computing environment or network from the request routers 140. The version change manager node 162 may be tasked with making higher level and slower decisions regarding request routing. Thus, it may determine more sophisticated metrics from the metrics captured by each router 140, over some period of time. The version change manager node 162 may observe these high-level metrics and make higher level changes to the routing behavior of the router fleet.

In some embodiments, the version change manager node 162 may implement a global policy update module 164. The global policy update module 164 may receive captured metrics from the request routers 140 and aggregate that data into a form that can be used to drive its decision-making. In some embodiments, the captured metrics may be received as portions of logs that are periodically sent to the version change manager node 162. In some embodiments, the request routers 140 may communicate with the version change manager node 162 via a pre-programmed API. In some embodiments, the version change manager node 162 may register as a listener for certain alerts that are generated by request routers 140, so that certain events in the captured data may be provided immediately and asynchronously to the version change manager node 162.

In some embodiments, the version change manager node 162 may implement a configuration interface 166. The configuration interface 166 may allow an administrator or another administration system to configure various operation parameters of the version change manager. For example, when a new version is introduced into the system 130, an administrator may provide a set of configurations regarding the deployment levels and policies associated with the new version, via the configuration interface. Depending on the embodiment, the configuration interface may be implemented as a graphical user interface (GUI), an application programming interface (API), or some other interface, such as a set of configuration files or data in a configuration data repository. The configuration interface may be used to view and update, for example, the different versions that are hosted in the system 130, the current deployment level of the versions, the definitions and upgrade/downgrade criteria of the different deployment levels, the types of data captured by the metrics collectors, the definition of diversity of coverage metrics, the different request types recognized by the system, among other things. In some embodiments, the configuration interface 166 may also allow an administrator to include various version-based rules at the router level. Such rules may be installed on the individual routers 140 as part of the individual routing policies 146 distributed to the routers.

Figure 2A:
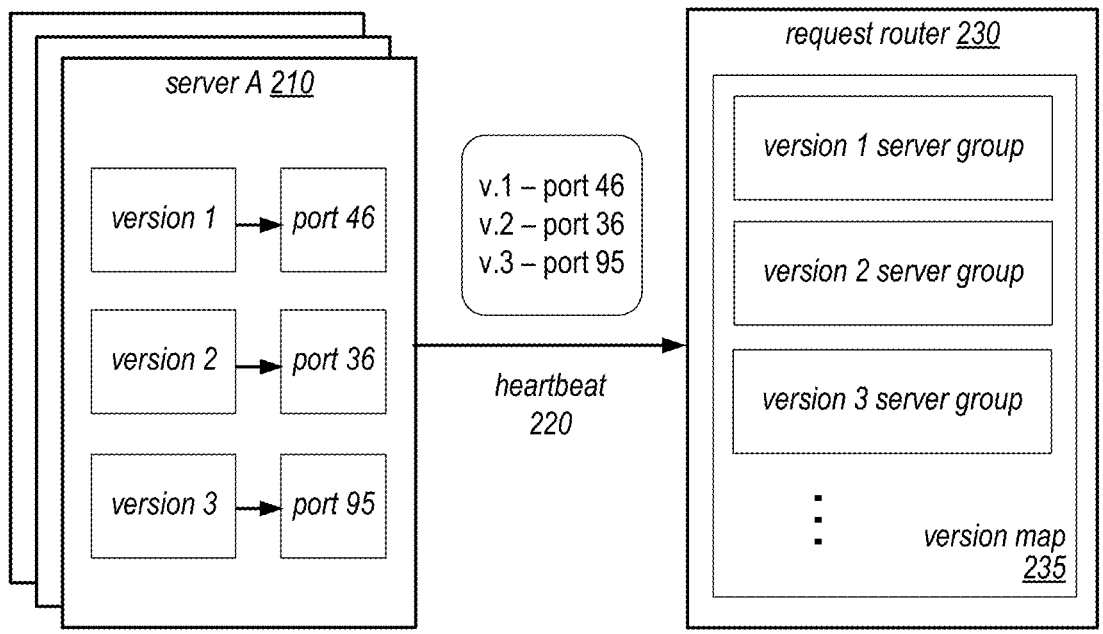
FIGS. 2A and 2B are diagrams illustrating different version discovery mechanisms that are performed by a computer system that implements version-aware request routers, according to some embodiments.
Figure 2B:
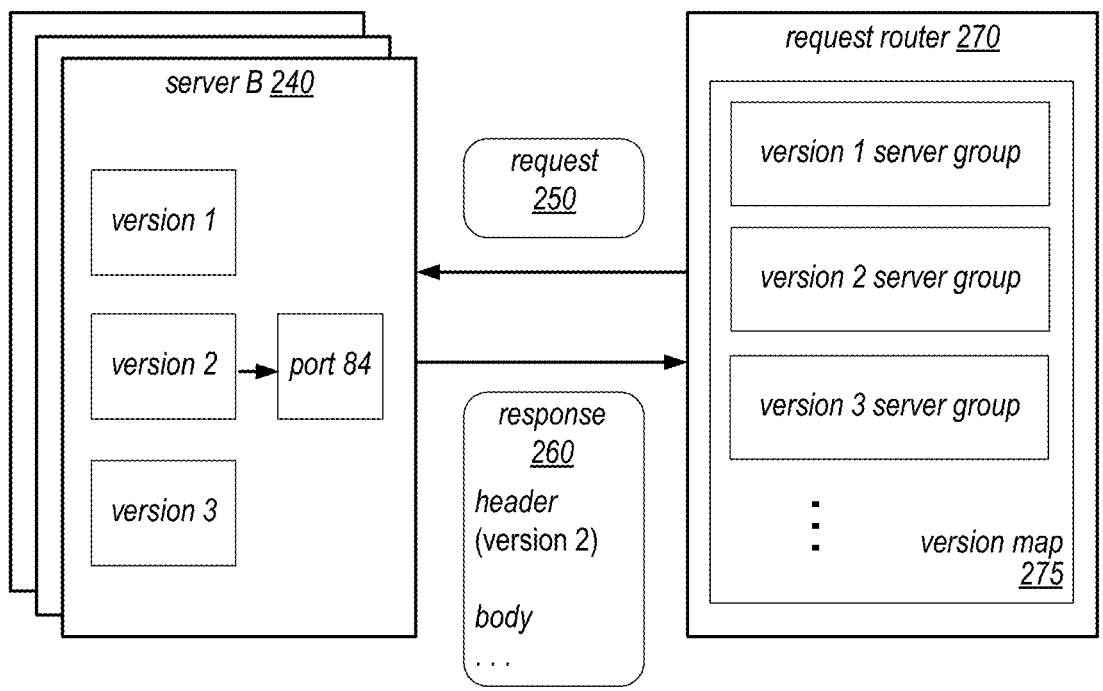

FIGS. 2A and 2B are diagrams illustrating different version discovery mechanisms that are performed by a computer system that implements version-aware request routers, according to some embodiments. FIG. 2A illustrates a discovery mechanism where a request router 230 discovers the versions of resources that are deployed on a server A 210. In this example, the version information is transmitted to the request router 230 in a heartbeat 220. In some embodiments, the servers or backend nodes in the system may generate regular heartbeats to the request routers, to indicate that they are alive. In some embodiments, the heartbeats 220 may also indicate the health status of the server nodes. In some embodiments, the versions of resources deployed on the server node may be included as part of the health status information transmitted to the request router in the heartbeat 220. As shown, in some embodiments, multiple versions of resources may be up and running on the server node 210, and each may be listening on a separate port. Thus, in some embodiments, the heartbeat may include information about the port numbers of the different versions, which can then be used by the request router to forward requests to the different versions.

In some embodiments, the request router 230 may maintain a version map 235, which reflects its current knowledge of the versions in the system. In some embodiments, the version map may be implemented as a map of versions to backend nodes, all nodes that deploy a particular version can be determined easily. For example, as shown, the version map 235 may group the nodes into version groups. In this manner, when the request router 230 decides to forward a request to a particular version, it may select a backend node from the desired version group in the version map.

FIG. 2B illustrates a different discovery mechanism where a request router 270 discovers the versions of resources that are deployed on a server B 240. In this example, the version information is transmitted to the request router 270 via a response 260 to a request 250 routed to the server node. Thus, in some embodiments, a server node may always use a single port to service requests, regardless of the version of the resource that is used. In some embodiments, each server node may only execute one version of the resource at any given time. From the request router's perspective, it cannot tell from the resource's network address which version it is interacting with. However, as shown, the server 240 may provide the version information (here version 2) in its response 260. In particular, in some embodiments, the response may include metadata, such as a header in for example HTTP responses. This metadata may include version information that indicates the version of the resource that generated the response. Accordingly, the request router 270 may determine the current active version of the server 240 from its response metadata, and store that information in its version map 275. In some embodiments, such version information may only be transmitted in certain types of responses, for example a response to an initial connection request.

Figure 2C:
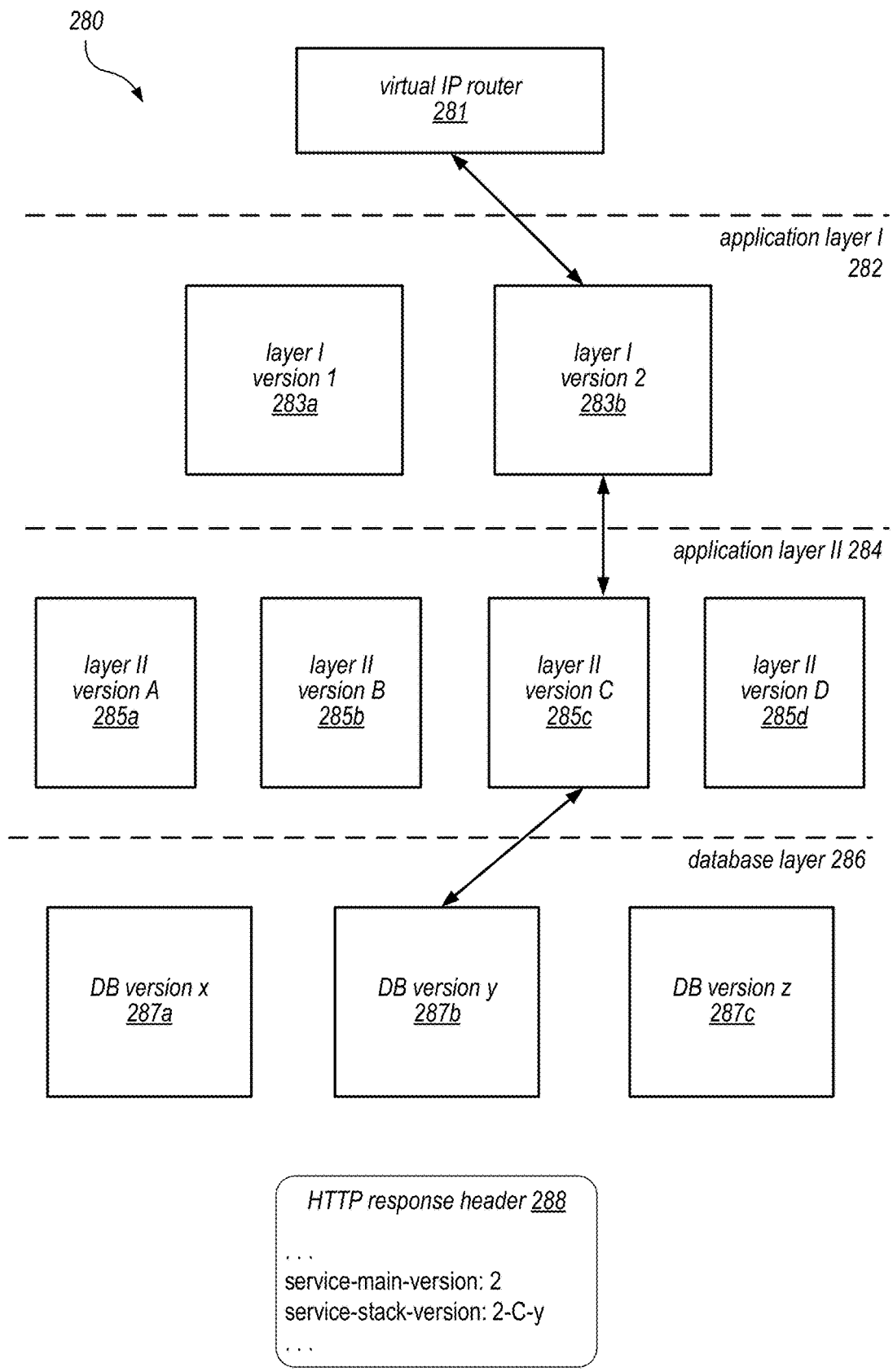
FIG. 2C is a diagram illustrating a composite version generated from an application stack that may be used in version-aware request routers, according to some embodiments.

FIG. 2C is a diagram illustrating a composite version generated from an application stack that may be used in version-aware request routers, according to some embodiments. In some embodiments, the overall version of a requesting handling resource may be composed of the version identifiers of its components or subcomponents. Thus, the overall version identifier may be a composite version identifier that reflects a combination of resource components that are used. In some embodiments, these resource components may change or be selected based on the type of incoming request, in a manner that is hidden from the request routers. In such embodiments, the resource may construct the composite version identifier during the servicing of the request, and include that composite version identifier in the request response returned to the request router. In this manner, the request router may learn the version number of the resource components that were used to handle the request, and use that information to collect metrics accordingly.

As shown in the figure, in some embodiments, a request handling resource may comprise an element (such as virtual IP router 281), that interfaces with clients of the resource. The virtual IP router 281 may direct incoming requests to different versions of applications implement in application layer I 282, which may include a version 1 (283a) and version 2 (283b). The application components in layer I, in turn, may select a version of a layer II component to perform additional tasks. For example, one of the versions 285a-d of layer II components may be selected by a chosen version 2 component of layer 1. In turn, a layer II component such as the chosen layer II version C component 285c may select an underlying database 287-a-c in the database layer 286. Thus, the handling of a single request may involve participation from different versions of components in different layers of the resource.

Figure 2D:
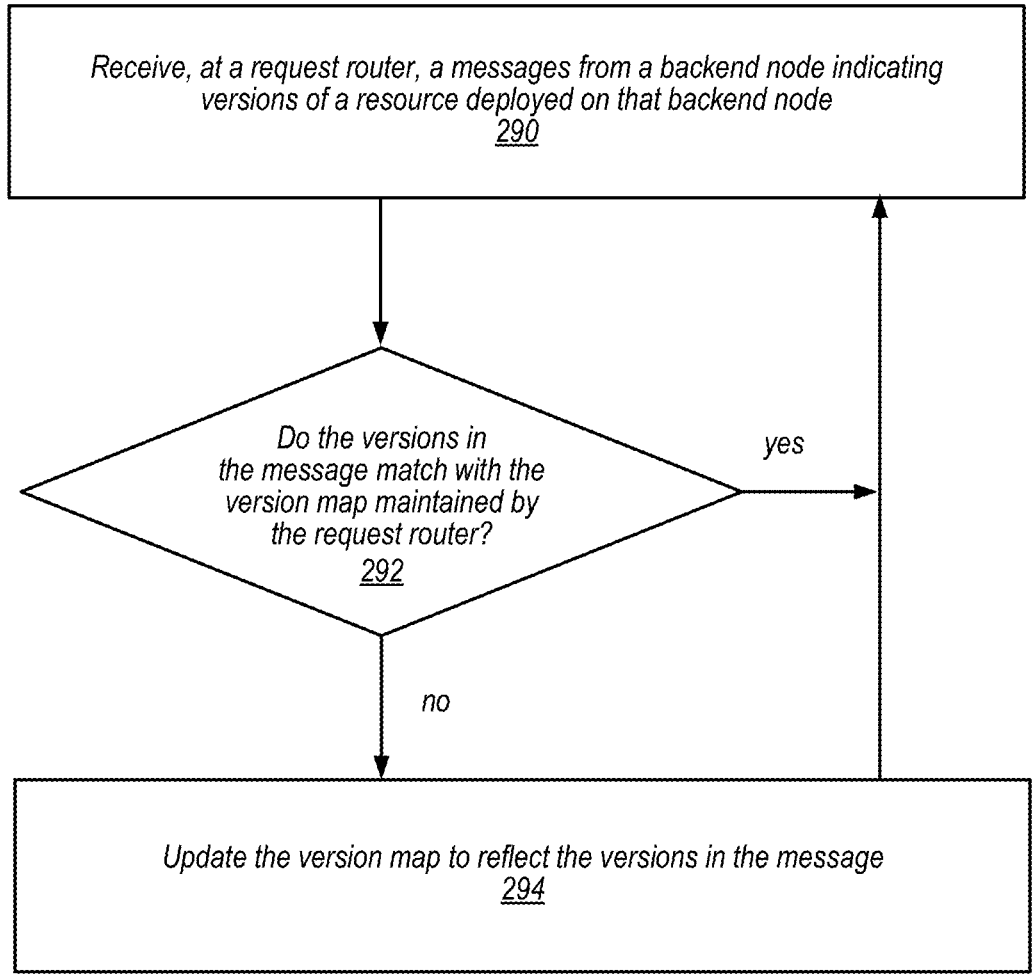
FIG. 2D is a flow diagram illustrating a version discovery process in a computer system that implements version-aware request routers, according to some embodiments.

In such embodiments, the resource may construct a composite version identifier, and include the composite resource identifier as the response to the request. For example, such a response may take the form of an HTTP response, which may include the HTTP response header 288 shown in the figure. The HTTP header 288 may include metadata in the form of key-value pairs, some of which may indicate the composite version identifier. As shown, the service main version is shown to be 2, while a service stack version is shown to be a combination of the version identifiers of the different resource components that are used as shown in the figure. In particular, the service stack version indicates that version 2 of the layer I component was used, version C of a layer II component was used, and version y of a database in the database layer was used. In some embodiments, the composite version identifier may be constructed by each successive layer of the resource as responses are propagated up the layers. For example, in the figure, database version y 287*b* may indicate its version in its response to layer II version C component 285*c*, which may then incorporate the database version in its own response to the layer I version 2 component 283*b*. In this manner, all version information of all resource components that are used to service a request may be aggregated in the response. The response may then be sent back to the request router, which may be configured to use the composite version identifier to track metrics according to different combinations of the resource component versions. FIG. 2D illustrates an exemplary version discovery process as a flowchart. As shown, in operation 290, a message is received at a request router from a backend node indicating versions of a resource deployed on that backend node. As discussed, the message may in some embodiments be a heartbeat message that the backend node regularly generates to indicate its health status. The heartbeat message may be used to indicate the deployed versions on that backend node. In other embodiments, the message may be a response to a request that was routed to the backend node. Thus, the request router may learn from the response which version on the backend node generated that response.

At operation 292, a check is made by the request router whether the version information received in the message matches with the data in the router's current version map. Thus, in most cases, a version that is indicated in a server node message is already known to the request router. However, in the event that a new version is deployed on the server node, that fact is quickly made known to the request router, which discovers via the compare that the server node has a newly deployed version. If so (e.g. there is not a match between the version information in the message and the version map), the process proceeds to operation 294, where the version information in the message is used to update the version map. If not (e.g. there is no new version information in the server node message), the process loops back to operation 290, where the request router continues to receive and check other server messages.

As may be understood, in this manner, the request routers may quickly and automatically detect or discovery all newly deployed versions in the backend nodes. And the request routers may then use its awareness of the versions to perform selective routing to the different versions of resources hosted on the backend nodes.

FIG. 3 illustrates metrics that are used by a version-aware request router to make routing decisions, according to some embodiments. The figure illustrates a table 300, which may, in some embodiments, be maintained in the operating memory of a request router, such as request router 140 discussed in connection with FIG. 1. The table 300 may be used to drive the routing behavior of the request router, and also be updated in real time by the router as it routes incoming requests to the server nodes.

As shown, the table 300 contains a number of records, each of which may correspond to an instance of a service that can accept requests from the router. In some embodiments, such data may be maintained by the router for other purposes, for example, to balance load between the different server nodes. As shown, the table 300 includes 12 service instances 00 to 0B.

As shown, the table 300 also contains a number of fields, which represents different types of data that tracked for each service instance. Field 310 indicates an identifier for the service instance. In this case, the identifier is simply an integer represented in hexadecimal form. In some embodiments, this identifier may be assigned by the deployment system 230 of FIG. 2. In some embodiments, the identifier may be a concatenation of a server identifier and a process identifier of the service instance. Field 312 indicates the server node that is hosting the service instance, and field 314 indicates the port (e.g., TCP port) that the service instance is listening on. Together, these two fields may contain the necessary information for the request router to communicate with the service instance. In some embodiments, such information may be stored as an explicit network address in the request router's routing table. In some embodiments, the request router may interact with the service instances at a higher application level, and such information may be hidden within the communication API of between the router and the service instances.

As shown, field 316 indicates the version of each service instance. For example, service instances 00 to 07 are operating version 1 of a service, while service instances 08 to 0B are operating version 2 of the service. In some embodiments, the versions may include major and minor version numbers. In some embodiments, these version numbers may be specified in the routing policy of the router, or the configuration data of the version change manager. Thus, the request router may use this information to track and control how many requests are routed to each version. In this manner, the request router may enforce rules in the request policy that specify the proportions of request traffic that are to be sent to each version.

As shown, field 318 indicates a state of each service instance. For example, most instances shown in the table are running, while instance 08 is blacklisted, and instance 09 is unresponsive. In some embodiments, a service instance may be blacklisted if certain conditions are detected for that instance. For example, if the instance (or hosting node) fails a health check or a security check, that instance may be blacklisted so that the router will no longer forward any requests to the instance. An instance may fail a health check for a variety of reasons. For example, a service instance may be blacklisted if it returns a fatal error code in response to one or more requests. In some embodiments, the instance may attempt to relaunch itself and indicate to the request router that it will no longer be able to handle requests. In some embodiments, the request router may determine, for example from a health message or heartbeat, that hosting node or instance is not in a safe state. For example, the server node may generate a health message or heartbeat indicating that is lacks a critical security patch given the current operations of the service instance. In this case, the request router may detect this problem from the health message and blacklist the service instance from receiving further requests. Unresponsive instances, for example instance 09, may also occur for a variety of reasons. For example, the instance process or the hosting node may unexpectedly crash. As a result, the request router may no longer receive any network messages from the service instance. In some embodiments, the request router may determine that the service instance is lost due to missing heartbeats from the server node or service instance. In any event, the request router may note that the instance has become unresponsive, and observe the service instance for some period of time. If the instance does not become responsive within that period of time, it may be delisted from routing table of the request router.

Field 320 indicates a count of requests that have been sent to each service instance. In some embodiments, these counts are used to ensure that each service instance is being treated fairly. In some embodiments, these counts may reset periodically, so that the count represents a most recent time window (e.g., 10 minutes). In some embodiments, the counts for all instances of each different version may be aggregated according to their version identifier, and used to determine the relative proportions of requests that have been sent to each version. This per-version count value may be separate tracked and controlled to effectual the version-based allocation rules in the routing policy.

Fields 322, 324, and 326 are fields indicating counts of different types of errors X, Y, and Z, respectively. For example, these counts may indicate the number of errors of each type that have been encountered by each service instance during a recent time window (e.g. 10 minutes). In some embodiments, these counts are determined based on responses (e.g., response codes) from the service instances generated from the requests. In some embodiments, an error may be raised by the request router if a service instance times out. The error counts captured by the request router may in some cases drive the immediate routing behavior of the router. In addition, the error counts may be used to make higher-level decisions about the versions, for example, calculate a performance score for a version to determine whether the version should be upgraded or downgraded in deployment level.

The different types of errors may be defined according to configuration rules. In some embodiments, error types X, Y, and Z may simply correspond different error codes that are generated from the resource. However, in some embodiments, the errors may be defined according to other parameters. For example, a type of error may be a contextual error that defined based on the input parameters of the request. For example, the request router may track an error type that correspond to all errors that result from requests of a particular user, or user account. In some embodiments, an error type may correspond to a particular geographic area (or IP address) of the request, or a particular time of the request, etc.

Field 328 indicates a latency value 328 for the service instances. These latencies may be an average value of the latencies that are determined by the request router, for all requests over a recent time window (e.g., 10 minutes). The latency may be determined as the difference between the time when a request is forwarded to an instance, and the time when a response is received from the instance. The latency value may be aggregated by version, and used to either drive the immediate routing behavior of the request router, and/or used to make high-level decisions about the versions, for example whether a version should be upgraded or downgraded. As discussed, at least some of the metrics in the table 300 may be kept in log form, or some other persistent form, by the request router, and periodically provided to a version change manager tasked with making version change decisions. In some embodiments, the metrics may be provided to the version change manager via an API, for example an alert API.

Figure 4A:
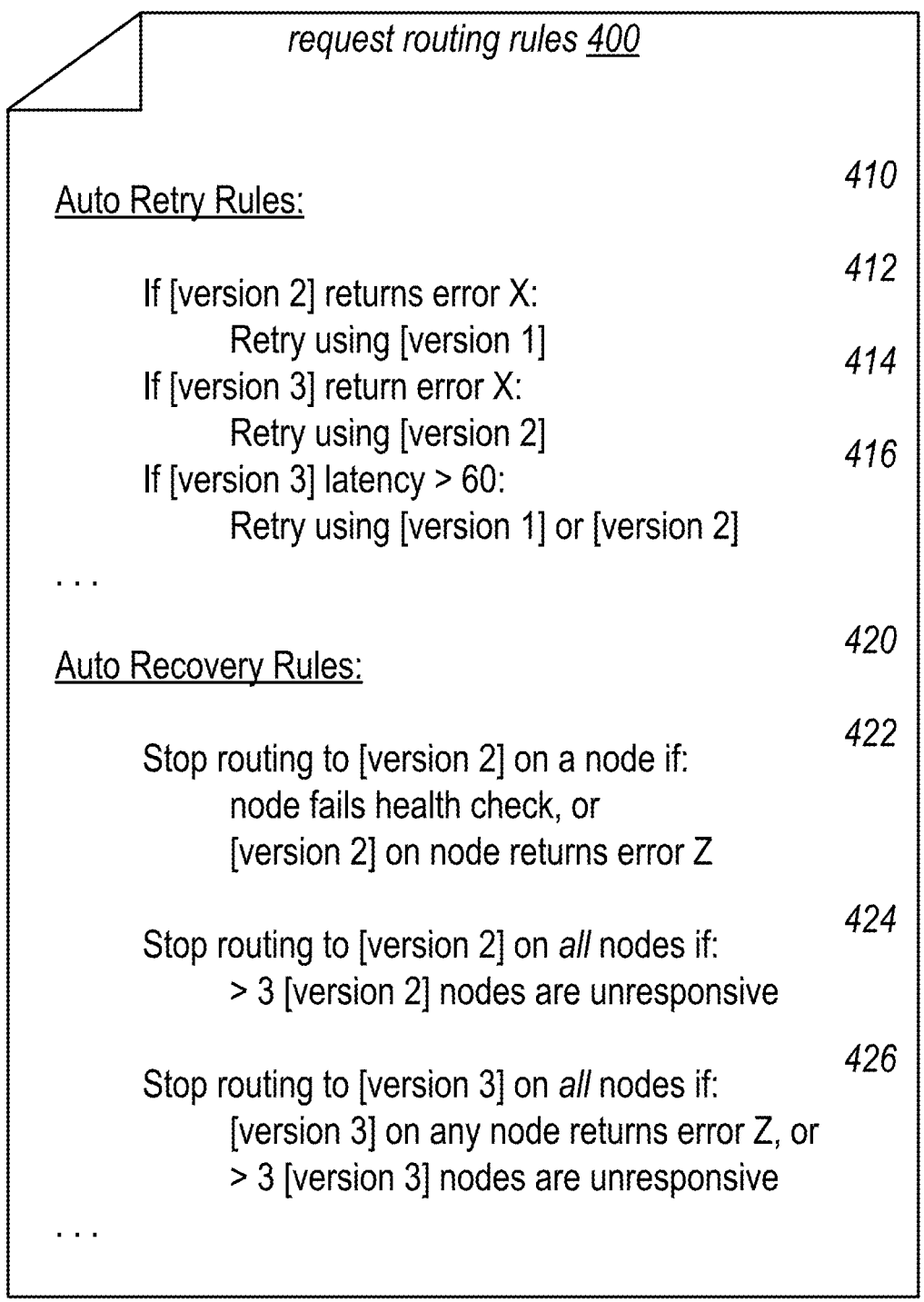
FIG. 4A illustrates example request routing rules used by a version-aware request router to make routing decisions, according to some embodiments.

FIG. 4 illustrates an example set of request routing rules used by a version-aware request router to make routing decisions, according to some embodiments. Such routing may be distributed to each request router in the system, and their contents may dictate the routing behavior of the request routers. As shown, the routing rules 400 may comprise a file (or multiple files), that contain low-level rules that may be followed by the request router on a request-by-request basis. In some embodiments, the routing rules may comprise a binary file or XML, file. In some embodiments, the routing rules may comprise a data structure that reside within part of a file, or in a data repository. In some embodiments, the routing rules may not be persisted on the request router, but only maintained in the router's runtime memory. The routing rules may be communicated to the routers by transmission of the file, data structure, or one or more API messages or call parameters.

As shown, the routing rules 400 may include a section 410 that indicates one or more auto-retry rules. In some embodiments, the routing policy may indicate that if the handling of a request by a first version of a service results in a particular condition, the same request should be retried using another version of the service. Thus, such retry behavior may mask certain non-critical errors in newer versions of the service, by using an older version as a fallback. For example, retry rule 412 indicates that if version 2 generates an error X for a request, the request should be retried using version 1. Similarly, rule 414 indicates that if version 3 generates an error X, the request should be retried using version 2. As may be appreciated from these rules, a single request may result in multiple retries by the request router. In some cases, the retry rule may indicate that a retry may be directed to one of a number of versions. For example, retry rule 416 indicates that if the latency of a request directed to version 3 is longer than 60 seconds, the request will be retried using either version 1 or version 2.

In some embodiments, the request router may keep track of its pending requests to backend nodes for which it has not yet received responses. When the request router detects a certain error condition with respect to a particular version, the request router may reroute all pending requests that have been forwarded to that version of the resource to another (possibly safer) version, based on one or more rules in the request routing rules.

As shown, the routing rules 400 may include another section 420 that indicates one or more auto-recovery rules. In some embodiments, an auto-recovery rule may indicate to cease routing requests to certain service versions, instances, or nodes, upon the detection of certain conditions. This determination is made locally by one request router in the routing layer, but may be propagated to other request routers via a peer-to-peer protocol. This mechanism to stop routing requests to certain service instances or versions is faster than the version upgrade/downgrade mechanism, which is a slower determination based on the observation performance data over time. In some embodiments, if a service instance or version triggers one of the auto-recovery rules, that instance or version may be blacklisted from receiving further requests, as discussed in connection with FIG. 3.

As shown, auto-recovery rule 422 indicates that an individual version 2 instance should be blacklisted on a service node if one of two conditions occur. First, the instance will be blacklisted if the node fails a health check by the request router, for example, because it is determined that the version software or node software lacks a critical security patch. Second, the instance will be blacklisted if the instance returns an error Z, which may be a fatal error or some condition indicating the failure of some fundamental assertion in the service software. Auto-recovery rule 424 indicates to cease routing requests to all version 2 instances in the system (i.e., blacklist the entire version) if more than three version 2 instances become unresponsive. As another example, auto-recovery rule 426 indicates that requests should not be routed to all version 3 instances in the system if any version 3 instance returns a fatal error Z, or if more than three version 3 instances become unresponsive.

In some embodiments, the system may include a master rule that suspends all rules that implement dynamic routing behavior on a request router, under certain conditions. For example, in some embodiments, the master rule may specify that if the system is experiencing a severe error that is not version-specific, or if the system is simply overloaded, that all request retry rules be suspended, as they tend to aggravate the problem. As another example, a severe error may indicate that an underlying database has become corrupted. In that event, the system may refrain from adjusting the routing behavior of the request routers via rules or the routing policy, as the problem will be the same no matter which version of the resource is used.

Figure 4B:
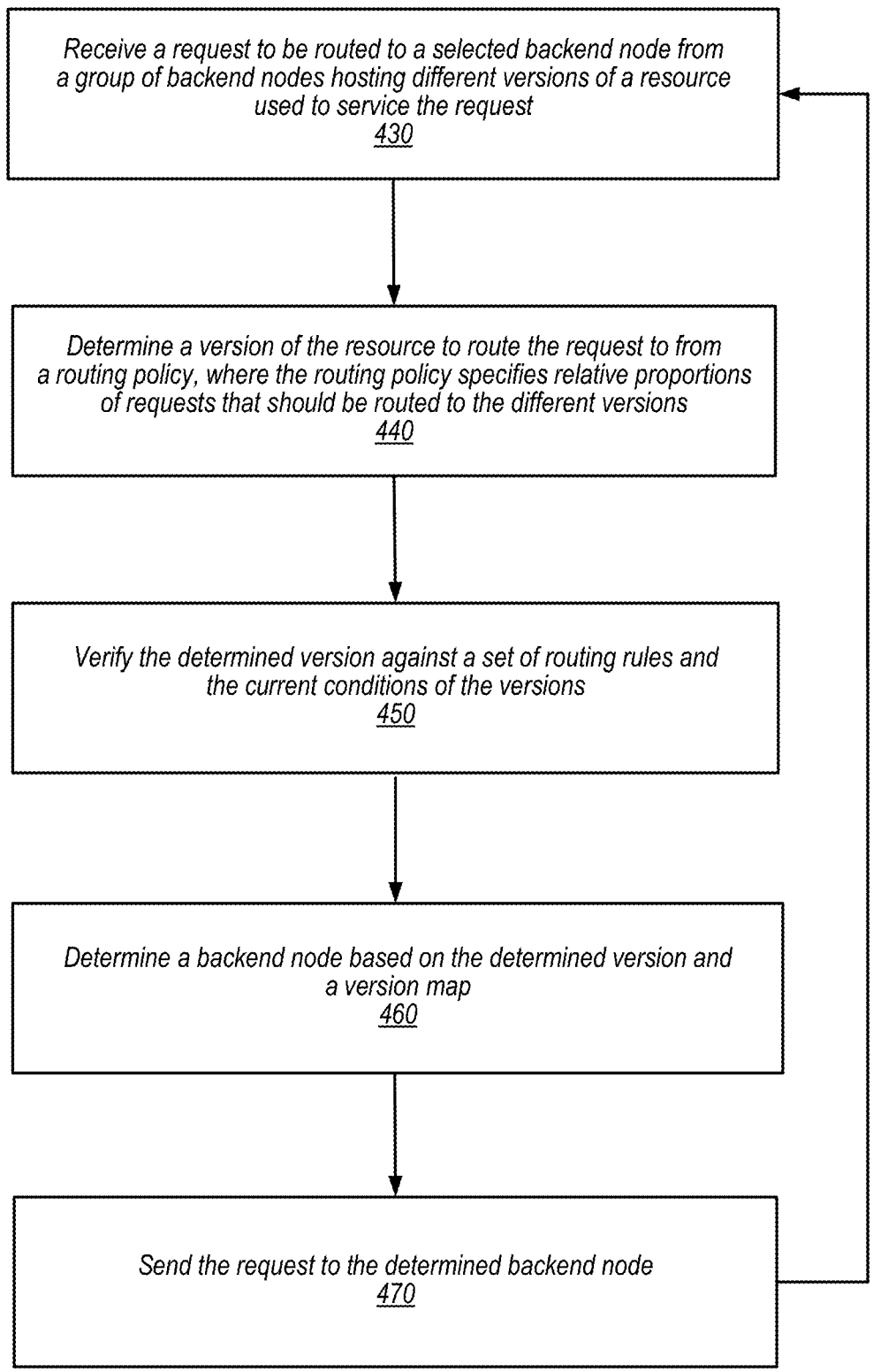
FIG. 4B is a flow diagram illustrating a process of routing requests in computer system that implements version-aware request routers, according to some embodiments.

FIG. 4B is a flow diagram illustrating a process of routing requests in computer system that implements version-aware request routers, according to some embodiments. The process in FIG. 4B may be performed, for example, the request router 140 as discussed in connection with FIG. 1.

At operation 430, a request is received to be routed to a select backend node in a group of backend nodes hosting different versions of a resource used to service the request. The resource may be, for example, a service, a platform component, which may be implemented using a combination of software and hardware. In some embodiments, a backend node may deploy multiple versions of the same resource that can be used to service the same request.

At operation 440, a version of the resource to route the request to from is determined from a routing policy, where the routing policy specifies relative proportions of requests that should be routed to the different versions. Thus, for example, the request router may maintain a count of the number of requests that have been forwarded to each version, and determine which version to route further requests based on the distribution of past requests. In some embodiments, the request router may ensure that requests are routed according to the relative proportions specified in the routing policy at distinct time periods (e.g., every day, every week, etc.) In some embodiments, a different routing policy is maintained on each backend node. Each backend node may update its routing policy independently, based on its own view of the different versions on the backend nodes.

At operation 450, the determined version is verified against a set of routing rules and the current conditions of the versions. The set of routing rules may be, for example, routing rules 400 discussed in connection with FIG. 4. The rules may in some embodiments be interpreted by a rules engine, which may operate as part of the request router. In some embodiments, the rules may simply prohibit routing of requests to a particular version, under certain error conditions. In some embodiments, the rules may indicate a fallback version in case a desired version is not available. For example, if a newer version is indicated to be in an error condition, the routing rules may specify that all traffic destined for version 2 should be diverted to an older version, for example version 1.

At operation 460, a backend node is determined based on the determined version and the version map of the request router. The version map may be for example version map 235 and/or 275 discussed in connection with FIGS. 2A and 2B. In some embodiments, once a version is determined, the request router may look up in the version map all backend nodes (and ports) associated with resources of that determined version. The request router may then select a backend node to forward the request. In some embodiments, the request router may select the backend node in a pseudorandom fashion. In some embodiments, the request router may select the backend node based on a selection policy, for example a load balancing policy to balance the loads of the backend nodes in the same version group.

At operation 470, the request is sent to the selected backend node by the request router. In some embodiments, the version map may include a network address for the selected instance of the resource. The request may thus be forwarded to that network address. The process then repeats over all, returning to operation 430. In this manner, the request router continuously receives requests and routes the requests to the proper version of the resources, in accordance with its routing policy and routing rules.

Figure 5A:
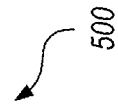
FIG. 5A illustrates metrics that are collected by a version change manager used to update the routing policy of version-aware request routers, according to some embodiments.

FIG. 5A illustrates metrics that are collected by a version change manager used to update the routing policy of version-aware request routers, according to some embodiments. In some embodiments, the metrics shown in the table 500 may be persisted in a data store accessible by the version change manager (e.g., version change manager 162 of FIG. 1). The version change manager may periodically analyze these metrics to determine whether an upgrade or downgrade of a version is warranted. As discussed, in some embodiments, the version change decision may be made by on the request router itself. Thus, the request router may implement a separate process that periodically adjusts its own routing behavior based on analysis these metrics. In some embodiments, the request routers may make these version change decisions individually. In other embodiments, a single (or subset of) master request routers may make the version change decisions collective for the entire system, and propagate those decisions to the rest of the request router fleet.

As shown, the metrics data in table 500 is organized by version. For example, the system may be tracking five different versions of a service, as seen listed in field 510: versions 1, 2, 2.1, 2.2, and 3. Fields 512, 514, and 516 indicates certain data on the current deployment state of each of the versions. For example, field 512 indicates the current proportion of requests that are allocated to each version. Field 514 indicates the number of instances that are deployed for each version. The values in fields 512 and 514 may be driven by the respective deployment levels of the versions. Field 516 indicates a number of instances that are presently up and running. For example, as shown, although version 2.2 has six service instances deployed in the system, only four are currently running. Two of the instances may have stopped running (e.g., become unresponsive or blacklisted). In some embodiments, such metrics may be provided as a summary of the status of each version on a user interface of the version change manager, for example the configuration interface 166 of FIG. 1.

As shown, table 500 divides additional fields into request types, such as request type A 520, B 530, and C 540. In some embodiments, the request types may be defined via configuration by an administrator. For example, one request type may specify a particular API call exposed by the service. Other request types may encompass requests from particular sources, received at particular times, or having particular request parameters, for example. In some embodiments, the segregation of requests into request types may not be performed at the request router level, which may be oblivious to the application-specific details of the services. Rather, the request router may simply capture a log of metrics data based on simple metrics capturing rules. After the logs are provided to the version change manager, the version change manager may then digest the logs to extract request-type-specific data from the log data.

As shown, for request type A 520, the table 500 tracks six fields. The count 522 may indicate the count of type A requests that have been handled by each service version, within some recent time window. As with other fields, the value in field 522 may represent an aggregate value (e.g., total or average) from the metrics of many request routers. The error fields 524, 525, and 526 indicate the aggregate error counts for errors X, Y, and Z respectively, for each version. The latency 528 may indicate an average latency of all type A requests, for each version.

Field 529 indicates a performance score for each version, for request type A. In some embodiments, a performance score may be calculated based on the other metrics of request type A, based on a calculation that is configurable or specified by the administrator. For example, the calculation may comprise some weighted combination of the values in fields 524, 525, 526, and 528. In some embodiments, the performance score may be used as one condition to determine whether a version is to be upgraded or downgraded. In some embodiments, the performance score may be used to determine a delta score, for one version against a second "base" version, to determine the amount of difference that exists between the relative behaviors of the two versions. The delta may also be used as a criterion to determine the upgrade or downgrade of a version.

In some embodiments, the contents of table 500 may be maintained over an evaluation period for each version, which may span the entire time that a version is deployed at a particular level. Thus, all of the metrics generated or calculated during a deployment level is used to determine whether the version can be upgrade to the next level (or downgraded to a previous level). In some embodiments, the metrics in table 500 may be refreshed and examined periodically, or snapshotted or logged, to monitor the ongoing performance of the version. In such embodiments, the upgrade or downgrade decision may be based on the periodic data obtained from the table.

Figure 5B:
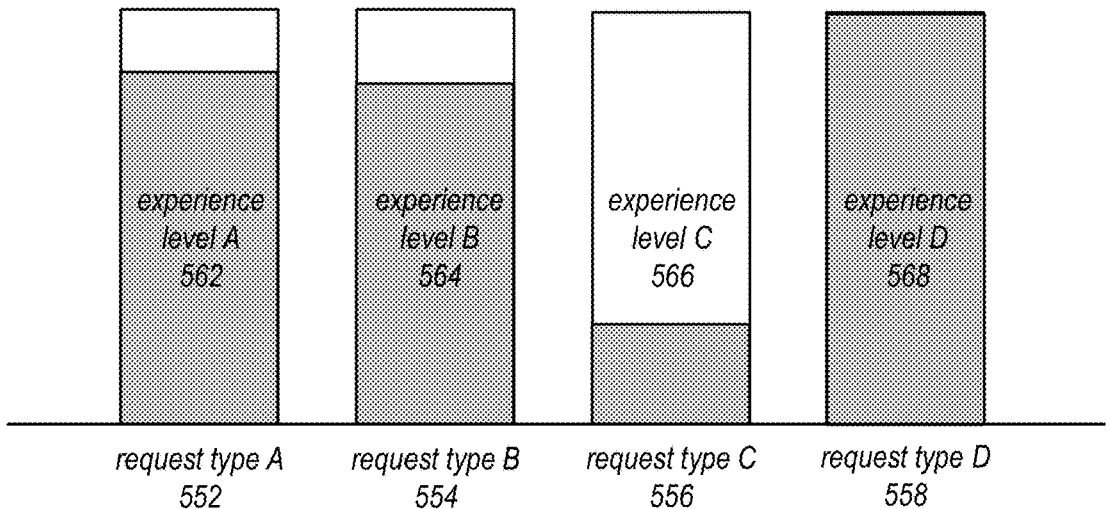
FIGS. 5B and 5C illustrate two different types of metrics that may be used to update the routing policy in a system that employs version-aware request routers, according to some embodiments.
Figure 5C:
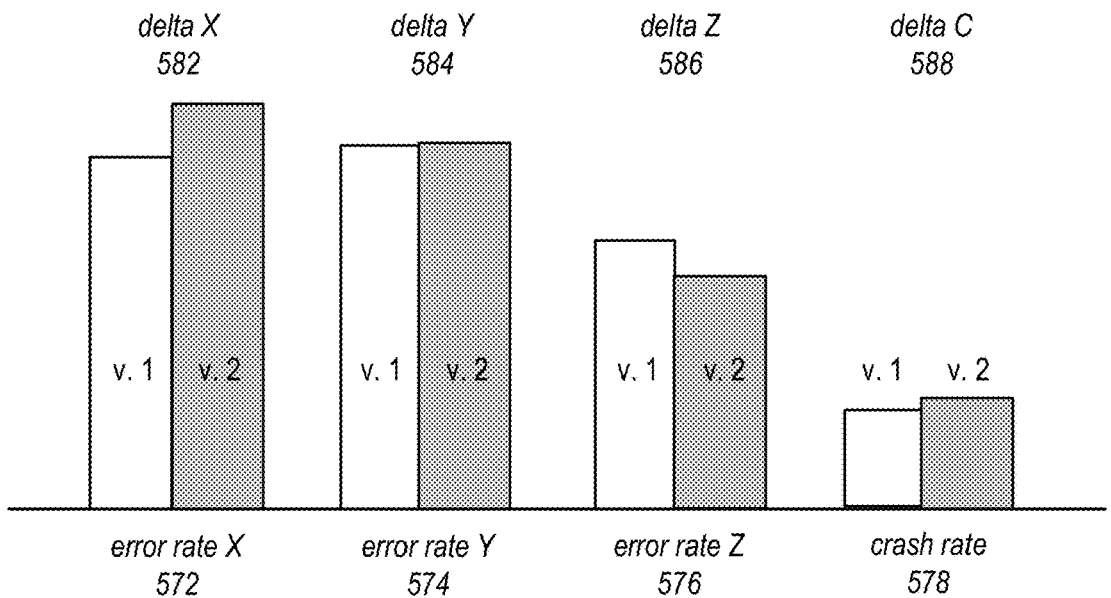

FIGS. 5B and 5C illustrate two different types of metrics that may be used to update the routing policy in a system that employs version-aware request routers, according to some embodiments. These metrics may be, for example, computed by the version change manager or the request routers over time, and used in the decision-making process to upgrade or downgrade the deployment level of versions. In some embodiments, these metrics may also be computed by each individual request router. Thus, each request router may determine a different diversity metric or comparison metric, as discussed below, so that each router can make its own independent decision on (for example) the deployment level of a version, based on its own view of these metrics.

FIG. 5B illustrates the determination of a diversity metric 550. In some embodiments, a diversity metric may indicate the amount of exposure or experience level that a particular version has with different types of request serviced by the system. As shown, four different types of requests are measured: request type A 552, B 554, C 556, and D 558. In each bar for each request type, the white portion indicate a maximum number of requests that will be measured to determine its experience level, and the colored portion indicates a current number of requests of that type that have been handled by a version. Thus, for example, for request type A, the maximum number of requests may be set at 2000, such that at 2000 requests, this particular version of the service will be deemed to have reached full experience level. The current number of requests for request A may be 1800, which is about 90% of the maximum. In some embodiments, the various experience levels (e.g. levels 562, 564, 566, and 568) may be aggregated using some formula to compute a diversity metric 550. The diversity metric may indicate a degree to which the version of the service has experienced sufficient diversity in terms the request types. For example, as shown, the service has experienced relatively large amounts of requests type A, B, and D, but relative small amounts of request C. Thus, in the formula, the term (1—level C) will be a large value, which causes the value of DV to be small. Thus, in this example, DV will be small if the experience level of any request type is relatively small. This diversity metric may thus be used to determine if this particular version is ready to be upgraded to a next deployment level. One criteria in the upgrade decision may be that the version has a sufficiently large value for the diversity metric. In different embodiments, such experience level may be measured in different ways. For example, in some embodiments, a "bake time" may be used to determine the experience level with request types, instead of request counts. A person of ordinary skill in the art would appreciate a variety of different ways to compute a diversity metric, and all of these computation methods may be employed in the disclosed system without departing from the spirit of the inventions.

FIG. 5C illustrates the determination of a comparison metric 570. In some embodiments, a comparison metric may indicate the behavioral differences between a version and a previous version, which may be considered to be the base version. Thus, one criterion used to upgrade the version in deployment levels may require that the version reach a performance level that is similar to the performance level of the base version. For example, as shown, four different types of error rates are measured by the system: error rates X 572, Y 574, Z 576, and a crash rate 578.

Each rate shows two bars. The uncolored bar indicates the measured rate for a version 1, and the colored bar indicates a measured rate for a version 2. The system may then compute a delta for the measured rates for each error rate, for example, deltas X 582, Y 584, Z 586, and C 588. The deltas may be computed, for example, as a difference between the values for version 2 and version 1, and then normalized by dividing the difference by the value for version 1. In some embodiments, the system may only recognize differences where version 2 is underperforming version 1. In that example, delta Z 586 may be determined to be 0, since version 2 in this case is exhibiting a lower error rate than version 1. The deltas may then be combined in a formula to compute a comparison metric such as comparison metric 570. In the illustrated example, the comparison metric 570 is simply a weighted combination of the deltas. Thus, the degree that version 2's performance lags version 1's performance is reflected in the value of the comparison metric, and this metric may be used as a criterion in the system's decision to upgrade or downgrade version 2. As may be appreciated by those skilled in the art, different metrics may be used to compute deltas, and the deltas may be computed in different ways, depending on the embodiment. Moreover, the formula to compute the comparison metric may also vary from embodiment to embodiment. All of these computation methods may be used in the disclosed system without departing from the spirit of the inventions.

Figure 6:
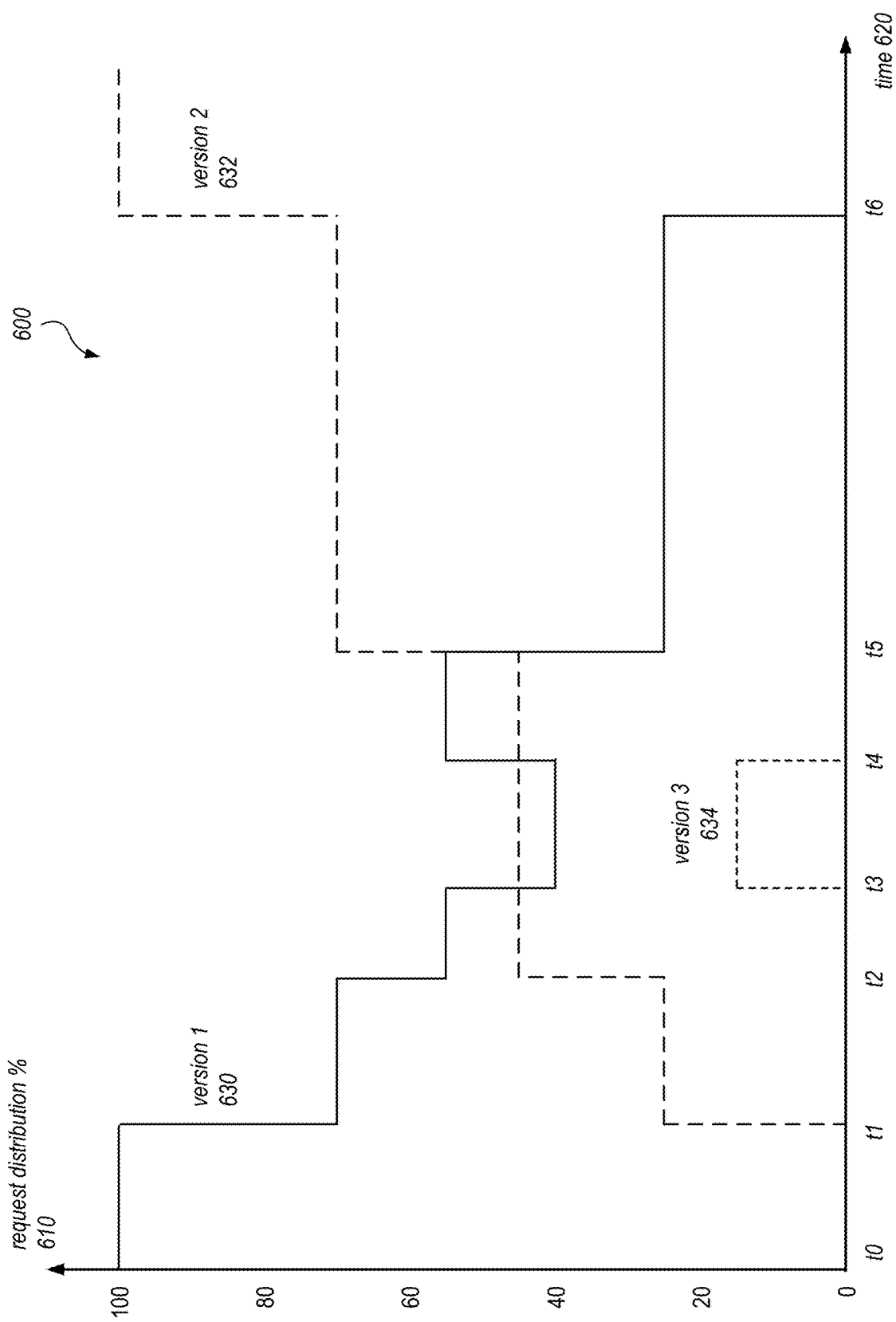
FIG. 6 is a graph illustrating the upgrading of downgrading of versions within a system that employs version-aware request routers, according to some embodiments.

FIG. 6 is a graph illustrating the upgrading of downgrading of versions within a system that employs version-aware request routers, according to some embodiments. As shown, the graph 600 plots the percentage of requests that are distributed to a number of different versions in a system, versions 1 630, 2 632, and 3 634, over a period of time. The vertical axis 610 indicates the request distribution percentage, and ranges from 0 to 100%, and the horizontal axis 620 indicates the time.

As shown, the request distributions for the three versions vary over time. For example, for version 1, during the period from t0 to t1, it is allotted 100% of the request traffic. However, during the period from t1 to t2, it is allotted only 90% of the request traffic. This decrease in the percentage of requests distributed to version 1 may represent a downgrade of the version. In some embodiments, the downgrade may be driven by an upgrade in another version. For example, as shown, at time t2, version 2 increases its percentage of request distributions from 25% to 45%. Thus, this may represent an upgrade of version two from one deployment level to the next, and the upgrade may cause the existing version 1 to be downgraded a level at time t2 (from 75% to 55%). As can be seen, over the entire period in the graph, version 1 is generally downgraded, and version 2 is generally upgraded. The graph may thus depicts the gradual deployment of version 2 into the system, which is performed in stages in order to minimize risk. At the same time, version 1 is gradually retired from the system, the version ceasing altogether at time t6. Each plateau seen in the graph may represent a deployment level of a version. As may be seen, as version 2 is upgraded, longer times are needed to promote the version to the next level. This may reflect the upgrade criteria employed by the version change manager, which may require longer observation times for progressively larger deployments of version 2. In some embodiments, after a certain point, a newly deployed version may no longer be demoted or rolled back by the system. For example, in the graph, once version 2 attains a deployment level at time t5, it may be deemed the baseline version in the ecosystem of layers, and it will no longer be demoted based on its monitored performance. At that point, version 1 may be considered deprecated, so that it is retired altogether after a period of time.

As shown, a version 3 is introduced into the system at time t3, starting its deployment at the 15% request distribution level. However, that deployment is ended at t4, when the version ceases to receive any requests. This may present a determination by the version change manager that version 3 is not safe enough to continue operation in the system. In some embodiments, version 3 may be downgraded due to the fact that its performance metrics met the downgrade criterion of the version change manager. In some embodiments, the downgrade may occur asynchronously from the normal version change schedule, due to some error condition. For example, some of the request routers may determine that a large number of version 3 service instances have crashed under the request traffic. In response, the request routers may have made the decision to cease sending any requests to version 3. Depending on the routing policy of the request routers (e.g., an auto-recovery rule), the void left by the downgrade of version 3 service instances may be filled by existing version 1 service instances, as shown in the graph at time t4. However, in some embodiments, the system may not revert traffic designated for a version back to an older version, depending on the circumstances. For example, in some cases the observed problem may be a systemic problem, or a type of problem that is not specific to a particular version. In some cases, the system may exhibit behavior that makes it unclear what the problem is, and that dynamically changing versions in this situation may complicate efforts to isolate the problem. In such case, a problematic version may not revert back to a baseline version.

In some embodiments, the decisions regarding the routing of requests to the different resource versions may also be used to drive actions in a deployment system. Thus, for example, in some embodiments, as more confidence is gained in a new version in the request router fleet, that confidence is also communicated to the deployment system, to deploy more instances of that version to the backend node fleet. Thus, the two subsystems may work in tandem to increase the presence of the new resource version in the system. As the request routers route a larger percentage of requests to the new version, the deployment system ensure that a larger percentage of backend nodes are loaded with the new version. These newly loaded versions are then quickly discovered by the request routers via their version discovery mechanisms, as discussed.

Figure 7:
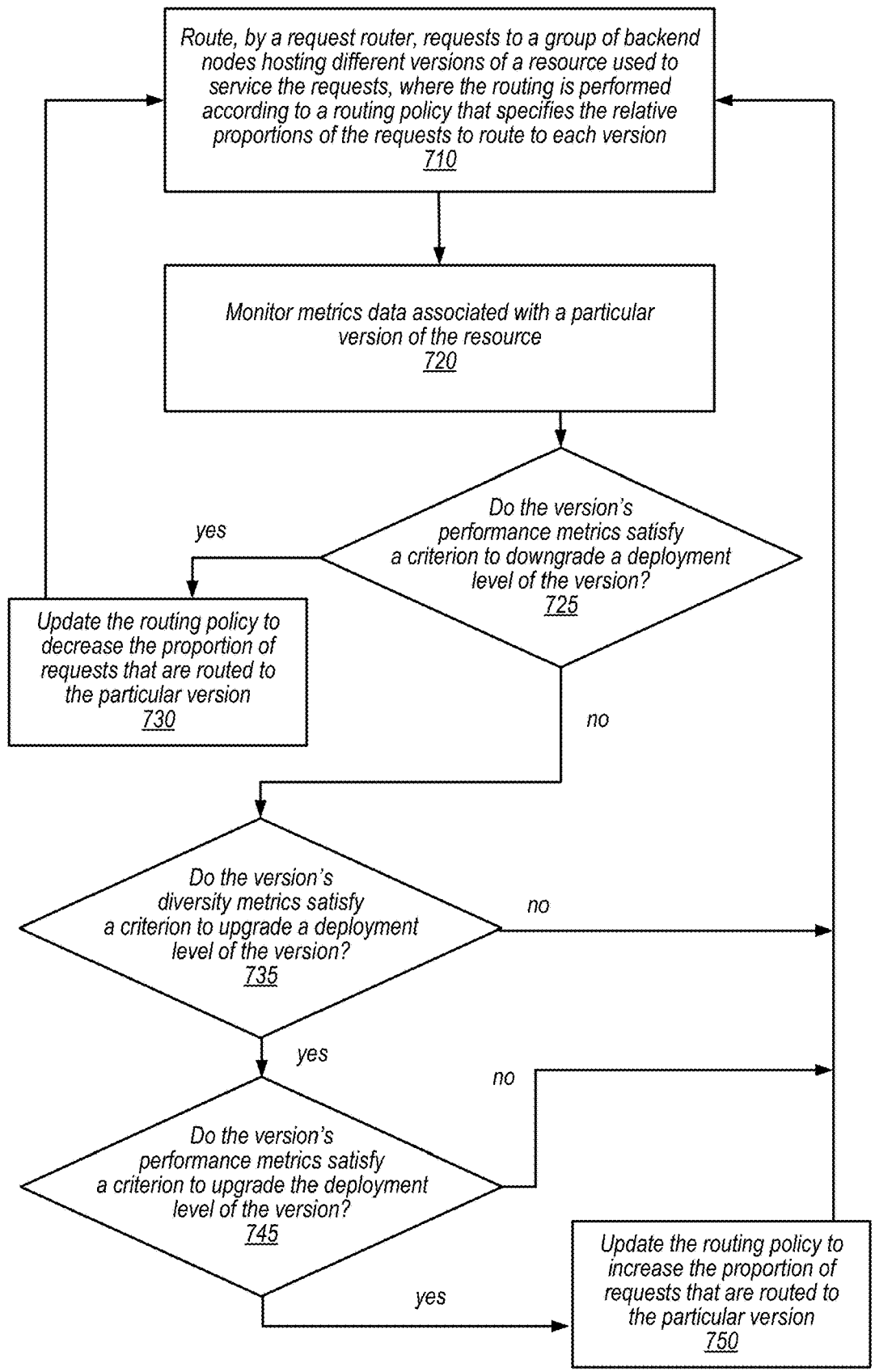
FIG. 7 is a flowchart illustrating the use of different rules in a routing policy within a system that employs version-aware request routers, according to some embodiments.

FIG. 7 is a flowchart illustrating the operation of a version-aware request router, according to some embodiments. The process depicted in the figure may be performed, for example, by the request router 140 as discussed in connection with FIG. 1, or in part by the version change manager 162, as discussed in FIG. 1.

At operation 710, requests are routed by a request router to a group of backend nodes hosting different versions of a resource used to service the requests. The routing may be performed according to a routing policy that specifies the relative proportions of the requests to route to each version. As discussed, each request may maintain a routing policy that determines the routing behavior of the router, which may be different from router to router.

At operation 720, metrics data associated with a particular version of the resource are monitored. In some embodiments, the metrics data may be captured and stored, for example in log form or in a data store. The metrics data may encompass a variety of data associated with the versions of the resource that are generated as requests are routed to the version. In some embodiments, the metrics may include a count of requests that have been routed to a particular version. In some embodiments, the metrics may include a count of errors seen from a version. In some embodiments, the metrics may include a measure of the average latency seen from a version. In some embodiments, the more sophisticated metrics may be computed based on observed metrics. For example, in some embodiments, metrics from each request router may be aggregated by a version change manager node, which may compute different metrics on top of the data. In some embodiments, a count of requests and errors may be separate by request or error type. In some embodiments, a performance score may be calculated based on a combination of factors, such as error count, latency, etc. In some embodiments, a comparison metric may be computed reflecting performance differences between a version and an older baseline version. In some embodiments, a diversity metric may be calculated to reflect the diversity of request types that have been handled by a version of the resource. These metrics may then be used to alter the routing behavior of the request routers, for example, by updating the router's routing policy.

At operation 725, a determination is made as to whether the version's performance metrics satisfy a criterion to downgrade a deployment a level of the particular version. In some embodiments, version deployment levels may be downgraded due to conditions indicating significant errors in the version of the resource. For example, an excessive amount of crashes may cause a version to be downgraded. As another example, an unacceptable long latency compared to a baseline version may cause a new version to be downgraded. If the determination is positive, the process proceeds to operation 730, where an update is applied to the routing policy of a request router to decrease the proportion of requests that are routed to that version. In some embodiments, a downgrade by one request router may be communicated to other request routers in a peer-to-peer protocol. If the determination is negative, the process proceeds to operation 735.

At operation 735, a determination is made as to whether the version's diversity metrics satisfy a criterion to upgrade a deployment a level of the particular version. In some embodiments, version deployment levels may be upgraded if a version of the resource has maintained a high performance and been exposed to a sufficiently diverse set of requests. Thus, the diversity metrics, which may include for example diversity metric 550 discussed in connection with FIG. 5B, indicate the degree of request diversity that has been seen by the version. If the version has not seen enough diversity to satisfy the criterion, the process does not upgrade the version deployment level, and returns to operation 710 to continue with routine routing. If the version has seen enough diversity to satisfy the criterion, the process proceeds to operation 745 to check the version's performance metrics.

At operation 745, a determination is made as to whether the version's performance metrics satisfy a criterion to upgrade a deployment a level of the particular version. As discussed, a version's deployment level may be upgraded if a version of the resource has maintained a high performance and over a sufficiently diverse set of requests. As discussed, the performance metric used to determine the upgrade may include a variety of metrics, such as error count, latency, and various performance scores such as scores generated based on comparisons to the performance of previous versions. If the performance metric is not satisfactory according to the criterion, the process does not upgrade the version's deployment level, and returns to operation 710. If the version's performance metric does satisfy the upgrade criterion, the process proceeds to operation 750, where an update is applied to the routing policy to increase the proportion of requests that are routed to the particular version. Thus, going forward, the request router will divert more requests to the version. In the illustrated process, operations 725, 735, and 745 represent example types of analysis that are performed on the metrics data for a version to determine updates to the routing policy. The process may repeat until the particular version is deemed a fully mature version, at which point it may be fully deployed on all of the backend nodes in the system.

As discussed, in some embodiments, the system may stop all dynamic updates to the routing policy, in some circumstances. For example, the system may stop or suspend routing policy updates when a high severity event is detected in the system. The system may implement a rule that automatically suspends the dynamic promotion and demotion of resource versions in response to such an event, as depicted in the figure, for example. For example, in some cases, suspending dynamic updates to the routing policy may prevent the system from needlessly promoting or demoting versions when the problem is systemic or not version-specific.

Figure 8:
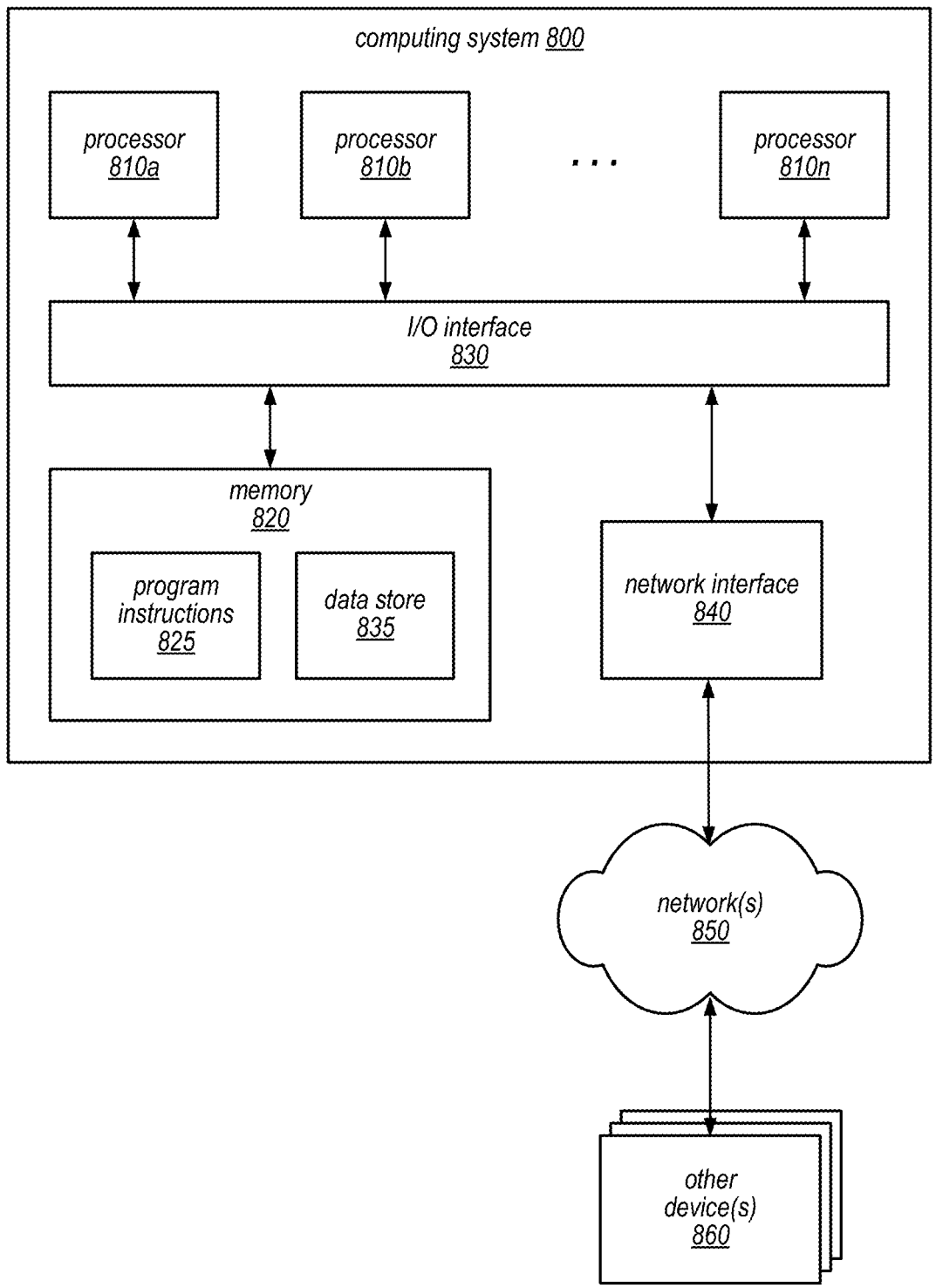
FIG. 8 is a block diagram illustrating an example computer system that can be used to implement one or more portions of a system that employs version-aware request routers, according to some embodiments.

FIG. 8 is a block diagram illustrating an example computer system that can be used to implement one or more portions of a version-aware request router, according to some embodiments. Computer system 800 may include or be configured to access one or more nonvolatile computer-accessible media. In the illustrated embodiment, computer system 800 includes one or more processors 810 coupled to a system memory 820 via an input/output (I/O) interface 830. Computer system 800 further includes a network interface 840 coupled to I/O interface 830.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 820 as code 825 and data 835.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 920, may be incorporated directly into processor 810.

Network interface 840 may be configured to allow data to be exchanged between computer system 800 and other devices 860 attached to a network or networks 850, such as other computer systems or devices, such as routers and other computing devices, as illustrated in FIGS. 1 through 7, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above for FIGS. 1 through 7 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   one or more processors with memory implementing a request router configured to, automatically and without user intervention:
      discover, based on messages received from a plurality of backend nodes, different versions of a resource that are deployed on individual ones of the plurality of backend nodes;
      update a version map based at least in part on the discovered versions of the resource;
      receive and route a plurality of requests to the plurality of backend nodes according to a routing policy and the version map, wherein the routing policy specifies relative proportions of requests to be routed to the different versions of the resource;
      monitor metrics resulting from the routing of the plurality of requests to the different versions of the resource;
      analyze the metrics to determine an update to the routing policy to change the relative proportions of requests to be routed to the different versions; and
      apply the determined update to the routing policy.

2. The system of claim 1, wherein, to discover the different versions of the resource deployed on the backend nodes, the request router is configured to:
   receive periodic health data from a backend node of the plurality of backend nodes; and
   determine a specific version of the resource deployed on the backend node based on the health data.

3. The system of claim 1, wherein, to discover the different versions of the resource deployed on the backend nodes, the individual request router is configured to:
   receive a message from a backend node; and
   determine a specific version of the resource deployed on the backend node based on version data included as metadata with the message.

4. The system of claim 1, wherein the request router maintains a routing policy that is updated independently from other routing polices for different request routers.

5. The system of claim 1, further comprising:
   a version change manager node implemented by one or more processors and associated memory to:
      receive the metrics from a plurality of request routers including the request router;
      analyze the metrics to determine another update to the routing policy to change the relative proportions of requests to be routed to the different versions; and
      send the other update to the request routers.

6. A method, comprising:
   performing, by a request router implemented by one or more processors and associated memory automatically and without user intervention:
      discovering, based on messages received from a plurality of backend nodes, different versions of a resource that are deployed on individual ones of the plurality of backend nodes;
      updating a version map based at least in part on the discovered versions of the resource;
      receiving and routing a plurality of requests to the plurality of backend nodes according to a routing policy and the version map, wherein the routing policy specifies relative proportions of requests to be routed to the different versions of the resource;
      monitoring metrics resulting from the routing of the plurality of requests to the different versions of the resource;
      analyzing the metrics to determine an update to the routing policy to change the relative proportions of requests to be routed to the different versions; and
      applying the determined update to the routing policy.

7. The method of claim 6, wherein discovering the different versions of the resource deployed on a backend node comprises determining the different versions based on a heartbeat message received from the backend node.

8. The method of claim 6, wherein discovering the different versions of the resource deployed on a backend node comprises determining the different versions based on metadata in a response generated by the backend node in response to a request routed to the backend node.

9. The method of claim 6,
wherein the different versions are assigned to different respective ports on a backend node hosting the resource; and
discovering the different versions comprises receiving an indication that a particular version is listening on a particular port of the backend node.

10. The method of claim 6, wherein analyzing the metrics comprises:
determining a diversity metric for a particular version of the resource from the metrics, wherein the diversity metric is based on amounts of different request types that have been handled by the particular version of the resource.

11. The method of claim 6, wherein analyzing the metrics comprises:
determining a performance difference between the metrics for a newer version of the resource and an older version of the resource.

12. The method of claim 6, wherein analyzing the metrics comprises:
determining response codes or error codes associated with requests routed to the particular version.

13. The method of claim 6, wherein:
said analyzing the metrics comprises determining from the metrics an error condition associated with a particular version of the different versions; and
said applying the update to the routing policy causes routing of additional request to the particular version to cease.

14. The method of claim 6, wherein:
said analyzing the metrics comprises determining from the metrics that a first version of the different versions is in an error condition;
and further comprising:
determining a pending request that is routed to the first version; and
rerouting the pending request to a second version of the different versions.

15. The method of claim 6, further comprising:
sending the metrics, by a request router of the plurality of request routers to a version change manager node that is remote from the request router;
performing, by the version change manager node:
aggregating metrics from the plurality of request routers;
analyzing the aggregated metrics to determine another update to the routing policy; and
sending the other update to the routing policy to the plurality of request routers.

16. A non-transitory computer-accessible storage medium storing program instructions that when executed on one or more processors of a request router, cause the request router to, automatically and without user intervention:
discover, based on messages received from a plurality of backend nodes, different versions of a resource that are deployed on individual ones of the plurality of backend nodes;
update a version map based at least in part on the discovered versions of the resource;
receive and routing a plurality of requests to the plurality of backend nodes according to a routing policy and the version map, wherein the routing policy specifies relative proportions of requests to be routed to the different versions of the resource;
monitor metrics resulting from the routing of the plurality of requests to the different versions of the resource;
analyze the metrics to determine an update to the routing policy to change the relative proportions of requests to be routed to the different versions; and
apply the determined update to the routing policy.

17. The non-transitory computer-accessible storage medium of claim 16, wherein to discover the different versions of the resource deployed on the backend nodes, the program instructions when executed on the one or more processors cause the request router to discover the different versions based on periodic health data received from the backend nodes.

18. The non-transitory computer-accessible storage medium of claim 16, wherein to discover the different versions of the resource deployed on the backend nodes, the program instructions when executed on the one or more processors cause the request router to discover the different versions based on metadata of responses generated in response to requests routed to the backend nodes.

19. The non-transitory computer-accessible storage medium of claim 16, wherein to discover the different versions of the resource deployed on the backend nodes, the program instructions when executed on the one or more processors of the request router cause the request router to discover a composite version from a backend node, wherein the composite version includes component versions of a plurality of components of the resource used by the backend node to service a particular request.

20. The non-transitory computer-accessible storage medium of claim 16, wherein the program instructions when executed on the one or more processors of the request router cause the request router to:
determine, from the analyzing of the metrics, that a first version of the resource is in an error condition;
determine a pending request that is routed to the first version; and
reroute the pending request to a second version of the resource.

* * * * *